United States Patent

[11] 3,616,000

| [72] | Inventors | Neil William Butzow<br>Greendale;<br>Bernard Harris, Milwaukee, both of Wis. |
|---|---|---|
| [21] | Appl. No. | 730,399 |
| [22] | Filed | May 20, 1968 |
| [45] | Patented | Oct. 26, 1971 |
| [73] | Assignee | Rex Chainbelt Inc.<br>Milwaukee, Wis. |

[54] SEAMLESS FABRIC-LINED BEARING OF MULTIPLE-LENGTH CONSTRUCTION
7 Claims, 10 Drawing Figs.

[52] U.S. Cl. .................................................. 156/173,
29/149.5, 156/86
[51] Int. Cl. ..................................................... B65h 54/10
[50] Field of Search ........................................... 156/173,
172, 86, 154, 191; 29/149.5; 51/290

[56] References Cited
UNITED STATES PATENTS

| 2,571,324 | 10/1951 | Young | 51/290 X |
| 2,652,093 | 9/1953 | Burton | 156/86 |
| 2,862,283 | 12/1958 | Rasero | 29/149.5 NM |
| 2,953,418 | 9/1960 | Runton et al. | 156/85 X |
| 3,350,030 | 10/1967 | Green | 156/173 X |
| 3,391,040 | 7/1968 | Keyt | 156/173 X |
| 3,466,210 | 9/1969 | Wareham | 156/86 |
| 3,470,917 | 10/1969 | Grosh | 156/173 X |

FOREIGN PATENTS

| 698,611 | 10/1953 | Great Britain | |

Primary Examiner—Carl D. Quarforth
Assistant Examiner—E. E. Lehmann
Attorneys—Ernst W. Schultz and Edward W. Mentzer ABSTRACT: A fabric sleeve having lengthwise yarns of a low-friction material and circumferential threads of a bondable but unshrunk material is secured on a mandrel utilizing the shrinkage of the circumferential threads. The sleeve is impregnated with a liquid resin and wrapped with glass filaments and additional resin. The resin is cured to form a rigid tube. When the mandrel has been withdrawn the tube has an internal bearing surface a predetermined size larger than the mandrel and may be cut to selected lengths to comprise the desired bearings.

SEAMLESS FABRIC-LINED BEARING OF MULTIPLE-LENGTH CONSTRUCTION

BACKGROUND OF THE INVENTION

1. Field of Invention

The subject matter of the claimed invention is a low-friction device to be fixed in a housing to provide the bearing surface and wherein the device comprises a sleeve, bushing or liner of a filament reinforced resin material having a low-friction bearing surface.

2. Description of the Prior Art

The prior art includes the molding of bearings or bearing liners directly over the journal or a mandrel substitute therefor; the manufacture of a series of bearings in the form of a tube which is then cut into short lengths; winding resin-bound glass filament tapes over a long mandrel in the manufacture of reinforced plastic pipe; and braiding yarns of low friction material on a long mandrel and thereover braiding glass filaments to form a resin-bound tubular structure which is then cut to bearing lengths.

The low-friction characteristics of various polythenes or polyethylenes has also been known since, for example, publication of British Pat. No. 698,611. As described therein, the polyethylene is drawn into filaments and woven with other yarn into a cloth which is embedded in a resin which is then hardened to comprise the bearing.

A modified polyethylene developed and sold as Teflon by E. I. duPont de Nemours and Company, Wilmington Del. has outstanding low-friction characteristics when drawn into a filament. Teflon is a tetrafluoroethylene which is stable and heat and wear resistant. However, this material is difficult to use because it is subject to cold flow under pressure and the few hardenable plastics or liquids which will adhere securely thereto are themselves difficult to handle.

U.S. Pat. No. 2,885,248 discloses a method of overcoming the cold flow difficulty by eliminating the "other yarn," i.e. by making the exposed cloth entirely out of Teflon so that the unexposed Teflon is entirely surrounded only by the hardened material in which it is embedded.

U. S. Pat. No. l2,804,886 (Re. 24,765 ) discloses a method of overcoming the bonding difficulty by providing a "compund" cloth woven so that the Teflon threads substantially form the exposed bearing face and leave the bondable yarn to form the other or opposite side.

The manufacture of bearings as taught by these patents requires that such cloth and the resin be placed under heat and pressure between the assembled bearing parts to be sure that the fabric is embedded in the resin and the resin fills the fabric. This requires that the fabric be cut in swatches, treated with resin, assembled and the assemblies individually handled throughout the entire manufacturing process.

In the prior art type of winding referred to which is adapted to the present invention, roves of glass filaments are drawn from creels under equal tension and passed through a container of liquid resin. The impregnated roves are gathered to form a tape which is wound in spiral layers over a rotating mandrel. Each spiral is pitched or has a pitch angle so that its adjacent turns are spaced a distance equal to or just slightly less than the width of the tape or a multiple thereof.

For example, a multiple of two may be used and the winding may start at the left end of the mandrel. At the right end the direction of the spiral is reversed. A this point, if the pitch angle is too great, the end of the first spiral must be secured to the mandrel to prevent being unwound by the start of the second spiral. This involves stopping the rotation of the mandrel, considerable lost time and extreme inconvenience caused by dripping of the liquid resin of the tape.

On this account, the pitch angle must be something less than 40° so that the tape stays in place when the direction of the winding is reversed. Thus, the mandrel may rotate continuously as the direction of the spiral is reversed at each end thereof.

In this manner the second spiral is crossed over the first; the third spiral is crossed over the second and alongside the exposed parts of the first; the fourth spiral is similarly crossed over the third alongside the exposed parts of the second; the fifth spiral completes the spiral pattern in one direction; and the sixth spiral completes the spiral pattern in the other direction.

Although the enlarged ends of the completed tube where the windings reverse must be cut off and scrapped, this type of winding especially allows high-speed, mass production techniques and is used in the manufacture of reinforced plastic pipe. The present invention successfully utilizes such techniques.

SUMMARY OF THE INVENTION

The present invention overcomes the difficulties encountered in attempts to utilize the prior art described to provide low-cost bearings equal to the relatively higher cost bearings manufactured in accordance with the U.S. patents mentioned. In particular, the invention provides a seamless fabric-lined bearing which can be manufactured in multiple lengths; a fabric which may be woven by conventional looms in sleeves of indefinite length and cut first to the multiple lengths referred to; a fabric which shrinks circumferentially to conform closely to the dimensions of the mandrel; a glass filament tape which compresses the fabric on the mandrel; a sleeve which "holds itself" on the mandrel and resists displacement by the tape which must be applied under tension; a finished bearing having a bearing surface of exposed Teflon filaments extending in one direction and intermediate Teflon-faced resin areas and having a crush-resistant body of resin-bound layers of glass filaments extending helically in alternate directions.

In particular, two problems were encountered in the development of the bearings of the present invention. For some time it was thought that, if not braided, the sleeve would have to be stretched on the mandrel. Shrinking the sleeve was considered but the possible difficulties in the axial shrinkage of sleeves of 4 feet in length, for example, temporarily diverted some attention to spiral wrapping and the braiding technique which is already part of the prior art. Also, technique was known beforehand that whatever resin is used, it must extend without voids through the fabric to the surface of the mandrel. However, the Teflon yarns must also be pressed against the mandrel so that they are adequately exposed in the finished bearing. Some types of fabric require more pressure than others to provide the desired or necessary ratio of exposed Teflon to exposed resin.

According to the present invention, the parallel yarns are of Teflon filaments and the circumferential threads are of a heat-shrinkable material such as "Dacron,l" having also the necessary tensile strength, chemical stability, resistance to heat and cold flow and, of course, capability of bonding to the resin to be employed.

This fabric can be woven to a size larger than the mandrel so that it can be readily drawn onto or over the mandrel. The mandrel and sleeve are then heated so that the sleeve in particular shrinks circumferentially whereby it is adequately secured on the mandrel but is also uniquely disposed in that the Teflon yarns are still relatively loose so that the capillarity of the resin can effect a complete filling of the fabric before the application of the tape under tension further presses the sleeve against the mandrel. This tension is adjusted to provide the desired Teflon/resin ratio referred to.

DESCRIPTION OF THE PREFERRED EMBODIMENT

Figure 3:
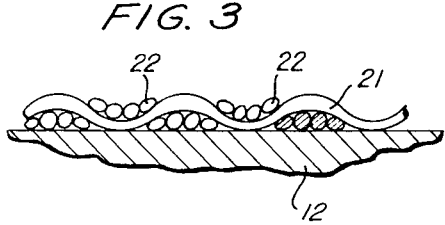
FIG. 3 is an enlarged longitudinal section through the sleeve as it is held against the mandrel by the shrinkage of the circumferential threads.
Figure 1:
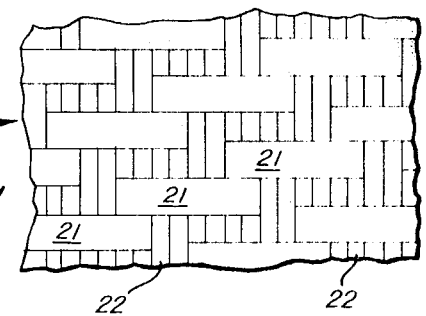
FIG. 1 is an enlarged view of s small section of the fabric as it may be woven into a sleeve.
Figure 2:
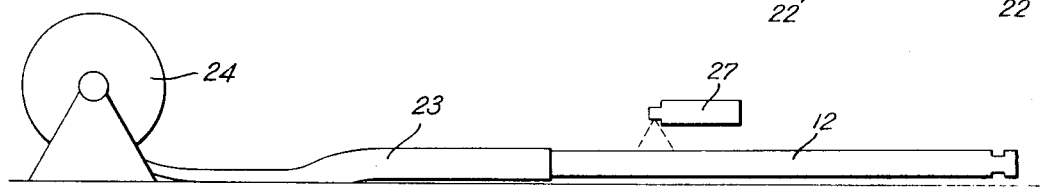
FIG. 2 illustrates the fabric sleeve being drawn from a reel and onto the mandrel.
Figure 7:
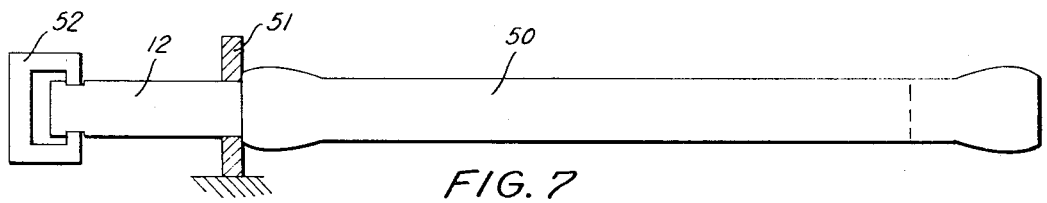
FIG. 7 illustrates the removal of the mandrel from the tube.
Figure 8:
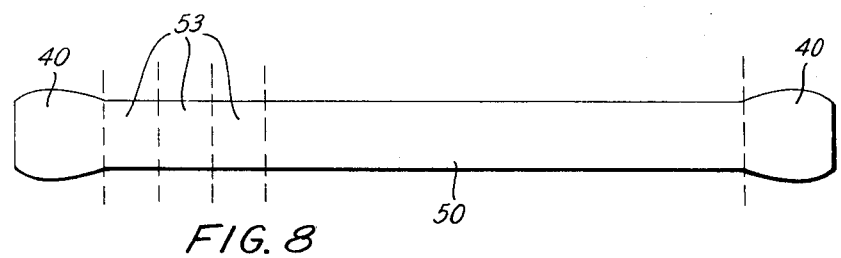
FIG. 8 illustrates cutting the tube to the desired bearing lengths after the ends are cut off.
Figure 9:
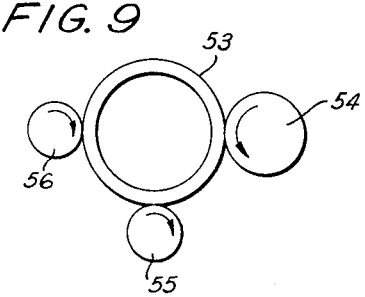
FIG. 9 illustrates centerless grinding the outside of each bearing to the selected cylindrical diameter.
Figure 10:
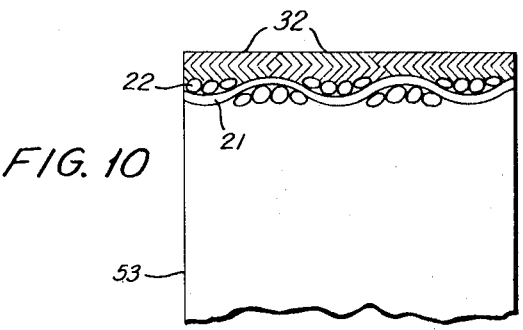
FIG. 10 is an enlarged section through one half of a completed bearing.
Figure 4:
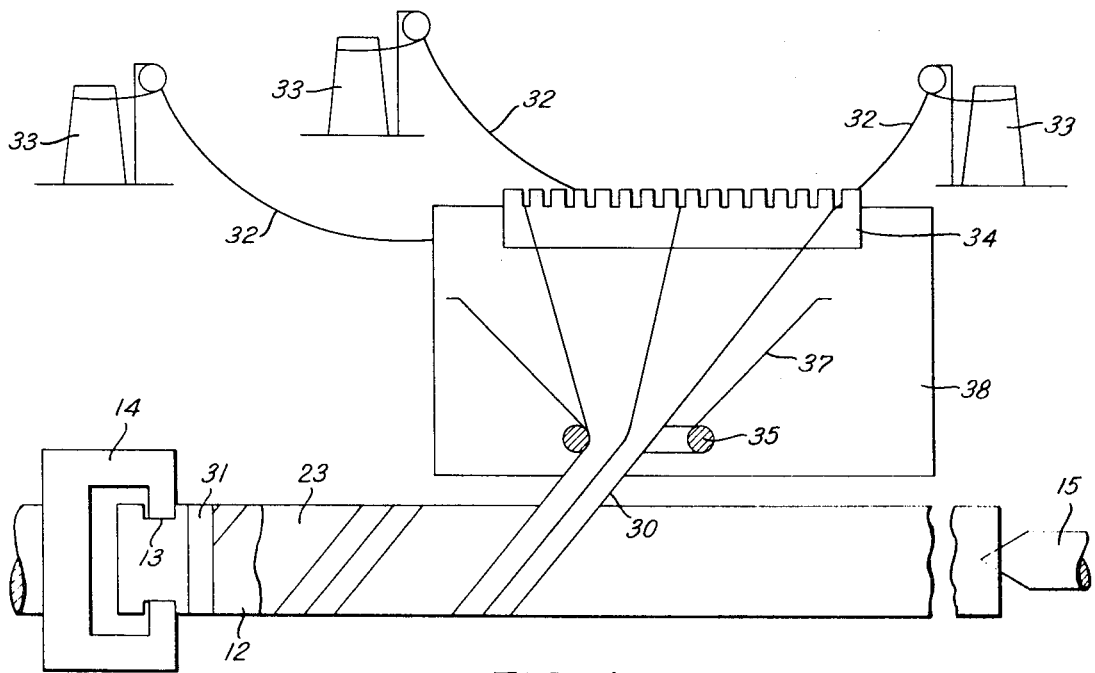
FIG. 4 shows in side elevation the mandrel as supported at its ends in a winding machine; the tape as it is wound over the sleeve; and diagrammatically, the roves as they are drawn from creels through the liquid resin and through the ring of the winding machine.
Figure 5:
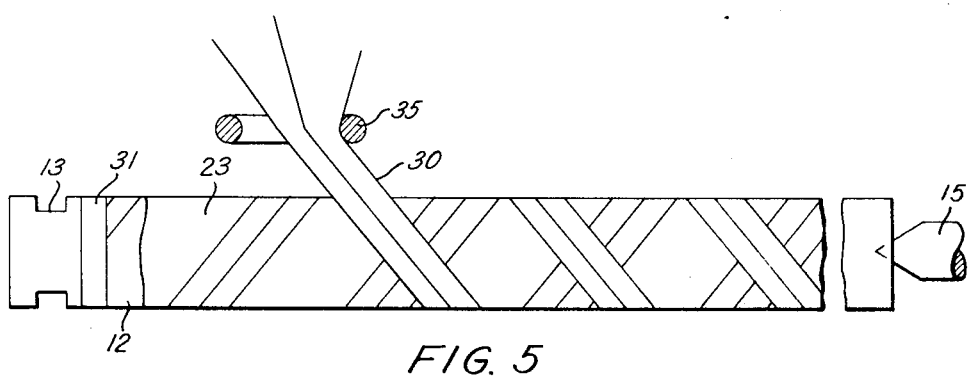
FIG. 5 shows the mandrel in elevation and the winding as it appears with the second spiral partially completed.
Figure 6:
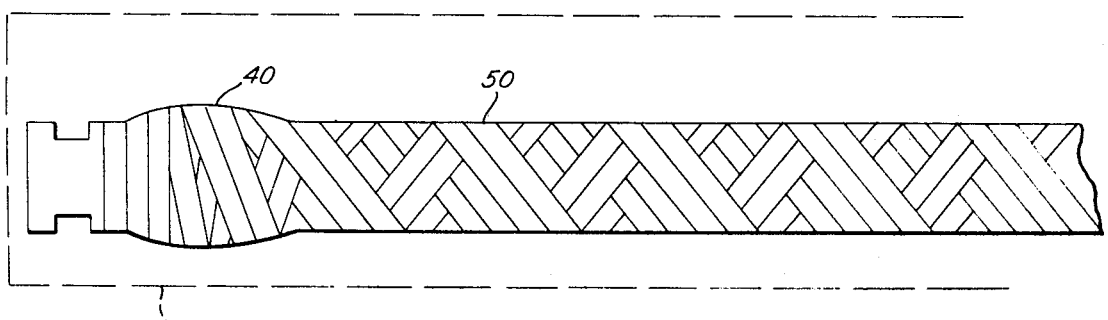
FIG. 6 is a plan view of the completed assembly which is rotated within an oven for curing of the resin.

The mandrel 12 is of stainless steel provided with a smooth polished surface and a diameter which with correction factors will determine the size of the finished bearing. The corrective factors will be described subsequently. For convenience, the mandrel is machined at both ends 13 to fit the driving head 14 of the winding machine, not otherwise shown, and the supporting arbor 15.

The fabric 20 shown in the drawing includes a warp of Teflon yarns 21 and a fill of Dacron yarns 22. The fabric is woven in the form of the sleeve 23 having a size slightly larger than the circumference of mandrel 12 and may be stored on the reel 24. The satin weave shown in one the several which may be found suitable. Two filler yarns 22 of Dacron filaments are used and they must, of course, be unshrunk. The Teflon yarns 21 have a denier very approximately twice that of the filler yarns 22 and may have a twist suitable to their warping. The denier of yarns 22 and 23 may be adjusted to provide optimum bearing properties with adequate securement of the fabric.

The mandrel is first coated with a parting-agent such as a silicone material available in an aerosol-pressurized spray can 27. Sleeve 23 is drawn from reel 24 and cut to a length less than that of mandrel 12 and drawn over mandrel 12. The mandrel is then placed in an oven to heat the sleeve momentarily to shrink yarns 22. Only a short time is required and no appreciable heating of the mandrel is required although an oven temperature of 400° F. may be desirable to completely shrink the sleeve. Alternatively, the fabric might be directly heated by infrared or high-frequency radio wave radiation. Heating the mandrel directly by passing it directly through a magnetic induction field would also be possible; resistance heating the entire mandrel directly by passing through it a large low-voltage electric current would also be possible. However, the temperature of the mandrel affects the resin as it is applied to the sleeve and the mandrel may have to be cooled prior to the next step.

In any case, some axial shrinking of 3 to 4 percent will occur whereas circumferential shrinkage of the Dacron of up to 12 percent can be utilized to conform the sleeve to the mandrel and secure it thereto.

Mandrel 12 is then supported between driving head 14 and arbor 15 of the winding machine. At this point it may or may not be desirable to apply to sleeve 23 a preliminary coating of resin depending upon such factors as room temperature and the resin-curing cycle.

The end of the prepared tape 30 is then secured as with band 31 to the end of the mandrel, at the left as shown. Tape 30 consists of a number of parallel roves 32 of glass filaments and the resin carried thereby. The roves are drawn as from the creels 33 and over the comb 34 in the usual manner.

Roves 32 may be dipped in a pan of resin before passing through the ring 35 disposed above the mandrel. Alternatively, as shown, roves 32 pass downwardly through the resin 36 carried in the cone 37 and through the ring 35 which comprises the lower end of the cone. Means such as a loose plug, not shown, is provided to close the lower end of the cone sufficiently to retain the resin supply.

Comb 34 and cone 37 including ring 35 are supported by the reciprocating carriage 38 which may also be provided with means, not shown, to keep the cone supplied with resin.

With rotation of mandrel 12 and reciprocation of carriage 38 the sleeve 23 is wrapped with the tape 30 in the prior art manner described. In particular it may be noted that the sleeve need not extend beneath the enlarged ends 40 which are unusable and must be cut off. Some attention must also be given the tension applied to the tape in winding. A tension in the order of 2 to 4 pounds per rove has been found adequate to keep the tape tight and also to be sure of driving or forcing the resin through the sleeve to the mandrel. With such a tension a pressure of 2 to 4 pounds per square inch would be applied to the sleeve. As previously mentioned, it is the adjustment of this pressure, by varying the tension referred to which can be utilized within limits to adjust the ratio of exposed Teflon and resin at the bearing surface.

When the wrap is completed the tape 30 is cut and the end is similarly secured as with band 31. The mandrel is removed from the winding machine and immediately ready for curing of the resin which has been applied.

The mandrel is handled at its ends only and is placed in the oven represented by the broken lines 45. The mandrel is supported horizontally by and between the rotating head 46 and the arbor 47 so that the mandrel rotates in the order of 30 r.p.m. during the curing cycle.

Alternatively, resin 36 may be directly heated by infrared or high-frequency radio radiation or the mandrel may be heated directly by magnetic induction or electrical resistance means.

Upon hardening of the resin 36 the rigid tube 50 is formed and when cooled may be removed from the mandrel. The cooling facilitates handling and the contraction of the mandrel 20 relative to tube 50 facilitates removing the tube from the mandrel. For that purpose the end of the tube 50 may be set against the block 51 and the end of mandrel 12 projecting therethrough may be pulled as with the gripper 52 to remove the same.

The tube 50 may be stored and any time as required, the individual bearings 53 of the desired lengths may be cut therefrom. The exterior of each bearing is finished first by grinding. Centerless grinding as by placing the bearing between wheel 54 and the rollers 55 and 56 is entirely satisfactory for smaller sizes. Larger sizes would be chucked and especially large sizes in the order of 12 inches in diameter and length might be ground in a lathe. The edges of the bearing may be smoothed with sanding.

The finished bearing 53 as shown in the enlarged section comprises the Teflon yarns 21 extending axially at the bearing surface, the Dacron yarns 22 extending circumferentially at the bearing surface, the surrounding layers of glass filaments of roves 32 extending in opposite spirals from end to end of the bearing and the hardened resin 36 which forms the body of the bearing.

The portions of the Teflon yarns 21 which originally were in direct contact with mandrel 12 are, of course, sufficiently exposed to form the major part of the bearing surface. The bearing will be subject to the same break-in wear which is a characteristic of friction bearings and, if desired, accelerated wearing of the surface prior to its installation may be resorted to where a minimum running clearance of the bearing is desired.

Any of the synthetic resins available would be suitable for certain applications. In general, an epoxy resin which is relatively stable in storage is preferred. By adding a selected catalyst in certain amounts to the resin as it is used, its viscosity as well as a predetermined curing cycle in terms of time and temperature may be selected and periodically adjusted as previous results indicate.

The resin in liquid form should have a low viscosity as applied to the fabric sleeve so that the interstices of the fabric are entirely filled by capillary action. Conversely, it is essential that no air is trapped by the resin. Consistent curing results require, of course, consistent conditions throughout.

The temperature of mandrel 12 as well as of the resin during winding of tape 30 should be consistent and room temperature (assumed to be consistent) is always the most convenient.

Upon heating, the resin should, of course, harden physically into a solid of uniform and adequate strength and should cure or change chemically into a solid of uniform and adequate resistance to chemical change.

The selection of yarns 23 to which the resin will securely bond, has been mentioned. The selection of a resin with a low-temperature or a high-temperature curing system may depend upon the type of yarns 23 selected. Generally, the Teflon of yarns 22 will be unaffected by the heat required for curing.

The corrective factors required in providing a mandrel of the size which will produce a bearing of the right size have been mentioned. It should be understood that the bearing will have the exact size of the mandrel at the time that the hardening of the resin occurs during the curing cycle and that the heating and expansion of the mandrel in relation to the time it is in the oven becomes a progressively greater variable.

Accordingly, for the present at least, a resin with a low-temperature system is preferred so that the variable referred to is minimized and in practice the size of the mandrel may be measured at room temperature. It is understood or known, of course, that friction (or low-friction) bearings of given diameters for tight, running or loose fits must be certain amounts larger than the journals or shafts operating therein.

Another although lesser variable is the expansion of the mandrel relative to the nominal expansion of the Dacron yarns and glass filaments. Since the tension of the Dacron and glass influences the Teflon/resin ratio, the selection of a low-temperature system similarly minimizes this variable.

The bearing of the present invention may be produced in quantity at low cost. The fabric of the bearing is seamless. The tape presses the sleeve against the mandrel operates with complete uniformity over the entire area of the fabric. Bearings of the same size can be consistently manufactured at relatively high speeds with consistent results.

The foregoing description of the invention and of the manner and process of making and using it sets forth the best mode or modes of carrying out the invention as presently contemplated. The following claim or claims particularly point out and distinctly claim the subject matter which is regarded as the invention.

We claim:

1. The method of constructing a bearing having an internal bearing face and an outer cylindrical form to fit within the bore of a housing, the bearing being of the type comprising a base material which hardens from a liquid to a relatively rigid material, a fabric of threads including a low-friction material embedded therein with one side thereof defining the bearing face with the bearing face being substantially free of a resin film overlying the fabric, and reinforcing filaments helically wound in layers around the fabric and embedded therein, which method comprises, placing the fabric on a mandrel, applying tension to the fabric circumferentially with respect to the mandrel so that said one side of the fabric conforms closely with the outer dimension of the mandrel, thereafter simultaneously applying the liquid material to the outside of the conformed fabric and rotating the mandrel about its axis and winding the reinforcing filaments helically and under tension over the fabric to compress the same and further conform said one side of the fabric to the outer dimensions of the mandrel and also to push the liquid material into the fabric to fill the fabric so that the liquid extends therethrough to the mandrel, thereafter causing the material to cure and to harden while rotating the mandrel about a horizontal axis to form a rigid tube, removing the tube endwise from the mandrel, cutting the tube to the desired bearing lengths and mechanically removing the hardened material outside the desired finished outside diameter to size the bearing for insertion in the bore of a housing.

2. The method of manufacturing a bearing having an internal bearing face and an outer cylindrical form to fit within the bore of a housing, the bearing being of the type comprising a fabric including yarns of a low-friction material partially embedded in a hardened resin to define the bearing face with the bearing face being substantially free of a resin film overlying the fabric, and reinforcing filaments helically wound in layers around the fabric and also embedded in such resin, which method comprises, weaving said yarns with other heat-shrinkable yarns extending circumferentially to form a sleeve, heat shrinking said sleeve on a mandrel so that the low-friction yarns conform closely with the outer dimension of the mandrel and the sleeve is secured thereon, only thereafter and simultaneously applying liquid resin to the outside of the sleeve while rotating the mandrel about its axis and winding the reinforcing filaments helically thereover while under tension to compress the low-friction yarns against the mandrel and also to push the liquid material into the sleeve to fill the interstices thereof so that the liquid extends therethrough to the mandrel, thereafter causing the resin to cure and to harden while rotating the mandrel about a horizontal axis to form a rigid tube, removing the tube endwise from the mandrel, cutting the tube to the desired bearing lengths and mechanically removing therefrom the hardened resin and filaments to provide the desired finished outside diameter for insertion in the bore of a housing.

3. The method of claim 2 which includes adjusting and maintaining the tension of the glass filaments as they are wound over the sleeve to adjust and maintain uniformly the compression of the low-friction yarns against the mandrel until the resin has hardened.

4. The method of claim 3 which includes filling the sleeve with liquid resin before winding the filaments and simultaneously winding parallel filaments with resin in the form of a tape which progressively presses the sleeve through the applied resin and against the mandrel.

5. The method of constructing a bearing having an internal bearing face and an outer cylindrical form to fit within the bore of a housing, the bearing being of the type comprising a base material which hardens from a liquid to a relatively rigid material, a fabric embedded therein and defining the bearing face with the bearing face being substantially free of a resin film overlying the fabric and reinforcing filaments helically wound in layers around the fabric and embedded therein, which method comprises, placing the fabric on a mandrel, applying tension to the fabric circumferentially with respect to the mandrel so that said one side of the fabric conforms closely with the outer dimension of the mandrel, only thereafter applying the liquid material to the outside of the fabric and rotating the mandrel about its axis and winding the reinforcing filaments helically and under tension over the fabric to compress the same and further conform said one side of the fabric to the outer dimensions of the mandrel and also to push the liquid material into the fabric to fill the fabric so that the liquid extends therethrough to the mandrel, thereafter causing the material to cure and to harden and rotating the mandrel about a horizontal axis as required to form a rigid tube, removing the tube endwise from the mandrel, cutting the tube to the desired bearing lengths and mechanically removing the hardened material outside the desired finished outside diameter to size the bearing for insertion in the bore of a housing.

6. The method of manufacturing a series of bearings each having an internal bearing face and an outer cylindrical form to fit within the bore of a housing, each bearing being of the type comprising a fabric including yarns of a low-friction material partially embedded in a hardened resin to define the bearing face with the bearing face being substantially free of a resin film overlying the fabric and reinforcing filaments helically wound in layers around the fabric and also embedded in such resin, which method comprises, weaving said yarns with other heat shrinkable yarns extending circumferentially to form a sleeve, heat shrinking said sleeve on a rigid form so that the low friction yarns conform closely with the outer dimensions of the form and the sleeve is secured thereon, only thereafter applying liquid resin to the outside of the sleeve while rotating the form about its axis and winding the reinforcing filaments helically thereover while under tension to compress the low-friction yarns against the form and also to push the liquid material into the sleeve to fill the interstices thereof so that the liquid extends therethrough to the form, thereafter causing the resin to cure and to harden and rotating the form about a horizontal axis to form a rigid tube as required, cutting the tube to the desired bearing lengths and mechanically removing therefrom the hardened resin and filaments to provide separate bearings each having the desired finished outside diameter for insertion in the bore of a housing.

7. The method of claim 5 which includes adjusting and maintaining the tension of the glass filaments as they are wound over the fabric to adjust and maintain uniformly the compression of the fabric against the mandrel until the resin has hardened.

* * * * *